(12) United States Patent
Ao et al.

(10) Patent No.: US 7,065,284 B2
(45) Date of Patent: Jun. 20, 2006

(54) VARIABLE OPTICAL ATTENUATOR

(75) Inventors: Masahiro Ao, Tochigi (JP); Shinji Furuichi, Mohka (JP)

(73) Assignee: Hitachi Metals, LTD, Tokyo (JP)

( * ) Notice: Subject to any disclaimer, the term of this patent is extended or adjusted under 35 U.S.C. 154(b) by 45 days.

(21) Appl. No.: 10/929,693

(22) Filed: Aug. 31, 2004

(65) Prior Publication Data

US 2005/0047745 A1   Mar. 3, 2005

(30) Foreign Application Priority Data

Sep. 3, 2003   (JP)   ............................ 2003-311147

(51) Int. Cl.
*G02B 6/00* (2006.01)
*G02B 6/26* (2006.01)
(52) U.S. Cl. ........................................ 385/140; 385/39
(58) Field of Classification Search ................ 385/140, 385/39
See application file for complete search history.

(56) References Cited

U.S. PATENT DOCUMENTS

| 4,436,995 A | 3/1984 | Whitten |
| 5,461,686 A | 10/1995 | Weinberger et al. |

2002/0146231 A1   10/2002   Johnson et al.

FOREIGN PATENT DOCUMENTS

| JP | 6-18793 | 1/1994 |
| JP | 10-20123 | 1/1998 |
| JP | 2000-131626 | 5/2000 |
| JP | 2001-228337 | 8/2001 |
| JP | 2001-249313 | 9/2001 |
| JP | 2002-107639 | 4/2002 |
| WO | WO 00/16143 | 3/2000 |

OTHER PUBLICATIONS

B. Scholl, et al; In-line fiber optical attenuator and powermeter; SPIE vol. 1792 Components for Fiber Optic Applications VII (1992); XP 000199007; pp. 65-70; Sep. 10, 1992.

*Primary Examiner*—Frank G. Font
*Assistant Examiner*—Michael P. Mooney
(74) *Attorney, Agent, or Firm*—Sughrue Mion, PLLC

(57) ABSTRACT

The invention provides a variable optical attenuator capable of adjusting the attenuation of an optical signal to obtain the optical signal having a controlled intensity. The variable optical attenuator includes a circular loop formed by winding an optical fiber by at least one turn. The circular loop of the optical fiber is mechanically transformed into an oval loop to change the curvature radius at the deflected part of the optical fiber so that the attenuation of the output light is adjusted.

2 Claims, 4 Drawing Sheets

VARIABLE OPTICAL ATTENUATOR

BACKGROUND OF THE INVENTION

1. Field of the Invention

The present invention relates to a variable optical attenuator used in the field of optical communication.

2. Description of the Related Art

As the optical communication technology advances, the optical communication is conducted through a longer optical path and a more complex line. An optical line taking various paths is required to be connected to an optical communication apparatus and an optical transmission apparatus to process the optical signal. The intensity of light (referred to below as the "amount of light") varies according to the path taken by the line. If the lines which differ from each other in the amount of light are connected together, the deterioration of the S/N ratio may occur to reduce the optical transmission quality. In order to stabilize the transmission quality, there is needed an optical attenuator which substantially reduces the amount of light of one line having a larger amount of light to that of the other lines. Since the amount of light of a line often changes, it is essential to make the attenuation adjustable.

A variable optical attenuator is disclosed in various patent documents. For example, in a variable optical attenuator using a Faraday rotor based on the magneto-optics effect, which is disclosed in Japanese Laid-Open Patent JP 2001-249313 A, a Faraday rotor, a polarizer and an analyzer are arranged between the input optical fiber and the output optical fiber to align the optical axis. Whenever the light propagates in each of these elements, an insertion loss occurs. In addition, due to the polarization, the optical axis is deflected to make it difficult to align the optical axis between the input side and the output side.

Japanese Laid-Open Patent JP 2000-131626 A discloses a variable optical attenuator which changes the optical coupling by use of a reflecting mirror. In the variable optical attenuator, disposed between the input optical fiber and output optical fiber are a lens and a reflecting mirror positioned at the focal point of the lens. The angle of the reflecting mirror is changed to reflect the optical axis so that the amount of light propagating from the input optical fiber to the output optical fiber is changed. Consequently, many elements including the input optical fiber, the output optical fiber, the lens and the reflecting mirror positioned at the focal point of the lens are required to be accurately assembled; the configuration of the elements is complex to make the assembly more difficult.

Japanese Laid-Open Patent JP 2002-107639 A discloses a variable optical attenuator which adjusts the optical shielding on the optical path. In the optical attenuator, the input optical fiber and output optical fiber are disposed opposite each other with the axis of each optical fiber oriented to the identical direction; a shielding member is disposed on the optical path between the input optical fiber and output optical fiber. The movement of the shielding member allows the shielding of the optical path to be changed, thereby changing the amount of light. The optical axis alignment of the optical fibers positioned opposite each other is needed. In addition, the initial loss may change according to the variation of the distance between the two fibers, reducing the variable range accordingly. Furthermore, the variation among the attenuators is readily introduced.

A variable optical attenuator in which a linear optical fiber is partially deformed is disclosed in PCT International Publication WO 00/16143. In the optical attenuator, an optical fiber formed by removing the cladding thereof to expose the glass part so as to increase the attenuation is locally deformed. This causes the local concentration of the stress in the optical fiber to make it extremely fragile. In addition, a large deformation of the optical fiber may break the optical fiber and thus it is not possible to deform the optical fiber to a large extent, so that a large attenuation is difficult to achieve. Disclosed in Japanese Laid-Open Patent JP 6-18793 A is a variable optical attenuator formed by winding an optical fiber around a circular supporting member and partially deforming the optical fiber by use of a U-shaped plunger. In the optical attenuator, the optical fiber may undergo the local concentration of the stress. A variable optical attenuator in which an optical fiber is wound around a cylindrical core member to achieve attenuation is disclosed in Japanese Laid-Open Patent JP 10-20123 A. The optical attenuator is simple in structure, but requires the provision of the core members which differ in diameter according to the desired attenuation and thus time-variant amount of light is difficult to cope with. Disclosed in Japanese Laid-Open Patent JP 2001-228337 A is a variable optical attenuator which changes the diameter of a circularly wound optical fiber.

In most of the conventional variable optical attenuators, some optical elements are interposed between the input fiber and output fiber. Therefore, the optical path coupling between the input fiber and output fiber is indispensable, and thus the optical axis alignment is required. Since the core of an optical fiber is about 10 μm in diameter, even a slight difference of the optical axis causes an optical loss due to the misalignment of the optical axis. In addition, the optical elements including a Faraday rotor, a mirror and a lens, interposed between the input fiber and output fiber, have the optical loss of their own. In the case where the overall optical loss including the loss resulting from the misalignment of the optical axis and the loss of the optical elements is larger than the amount of light to be adjusted, not an optical attenuation but an optical amplification is needed. Therefore, it is essential to minimize the initial optical loss (attenuation) caused by the optical attenuator itself. The reduction of the initial optical loss of the optical attenuator requires the use of low-loss elements as well as the correspondence of the optical axis of the input fiber with that of the output fiber, and thus the optical attenuator becomes expensive. For the purpose of minimizing the initial optical loss, a proposal has been made that a fused bi-conical silica glass coupler is employed and the free end of the optical coupler is deflected, as disclosed in PCT International Publication WO 00/16143. In this case, however, the increasing of the attenuation of the amount of light requires a large amount of deflection. A large deflection of the fragile material of glass causes the local concentration of the stress, whereby there arises a risk that the material becomes more fragile due to the repeated deflections over a long period of use.

SUMMARY OF THE INVENTION

To address the above problem, an object of the present invention is to provide a variable optical attenuator which does not need an optical axis alignment between an input fiber and an output fiber, does not interpose optical elements between the input optical fiber and output fiber, and significantly reduces the initial optical loss caused by the optical attenuator itself, and additionally the variable optical attenuator is simple in manufacture, high in reliability, and low in cost.

The variable optical attenuator according to the present invention comprises: a circular loop formed by winding by at least one turn an optical fiber having an input end and an output end; and an actuator which, at two points positioned on the circular loop and corresponding to each end of a diametrical line of the circular loop, applies force in an opposite direction with respect to the two points along the diametrical line to transform the circular loop into an oval loop so that an amount of an output light of the optical fiber is reduced relative to an amount of an input light of the optical fiber.

Preferably, the variable optical attenuator further comprises: an optical power monitor connected to the output end of the optical fiber and used for measuring the output amount of light from the optical fiber; and a controller for comparing the amount of the output light measured by the power monitor to a predetermined amount of light to drive the actuator in accordance with a difference between the amount of the output light measured by the power monitor and the predetermined amount of light.

The minimum curvature radius of the oval loop formed by transforming the circular loop is preferably 10 to 35 mm.

DETAILED DESCRIPTION OF THE PREFERRED EMBODIMENT

Figure 1:
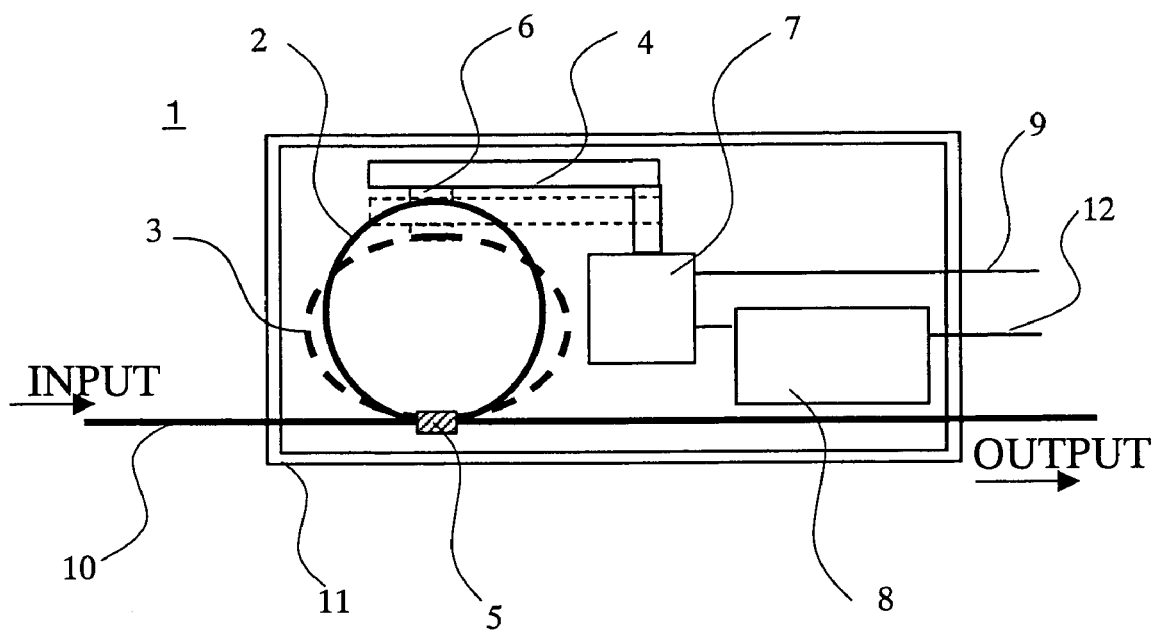
FIG. 1 is a plan view of a variable optical attenuator according to EXAMPLE 1 of the present invention.

A variable optical attenuator according to the present invention comprises: a circular loop formed by winding by at least one turn an optical fiber having an input end and an output end; and an actuator which, at two points positioned on the circular loop and corresponding to each end of a diametrical line of the circular loop, applies force in an opposite direction with respect to the two points along the diametrical line to transform the circular loop into an oval loop so that an amount of an output light of the optical fiber is reduced relative to an amount of an input light of the optical fiber.

An optical fiber has a concentrical double-layer structure composed of its core and cladding. The core or the inner part of the optical fiber is the light transmission area of the fiber; the cladding or the outer part of the fiber is different from the core in refractive index and serves to totally reflect the light propagating in the core. The light transmission is achieved by the total internal reflection of the light propagating in the core by use of the cladding. In bending the optical fiber, if the curvature radius of that bent portion is smaller than a given value, the total internal reflection of the light does not occur in the interface between the core and the cladding, whereby the cladding transmits the light to release it to the outside of the optical fiber, resulting in a loss. As the curvature radius of the bent optical fiber is smaller, a larger amount of light is released to the outside of the optical fiber to thereby increase the loss. In order to attenuate the amount of input light, the variable optical attenuator according to the invention effectively utilizes the phenomenon that the releasing of light to the outside of the optical fiber results in a loss. There is provided the variable optical attenuator capable of easily adjusting the optical attenuation by controlling the minimum curvature radius of the bent optical fiber.

An optical fiber is transformed into an oval loop by applying force, at two points positioned on a circular loop and corresponding to each end of the diametrical line of the circular loop, in an opposite direction with respect to the two points along the diametrical line of the circular loop formed by winding by at least one turn the optical fiber. Most preferably, the transforming force is applied at two points opposite each other on the diametrical line. However, the deviation from the diametrical line is allowable if the deviation angle is smaller than ±10 degrees. When the force are applied at two points positioned on a line deviating more than 10 degrees from the diametrical line, a shape different from an oval loop is formed to make it difficult to control the curvature radius.

When applying force along the diametrical line of the circular loop at the two points positioned on the circular loop and corresponding to each end of the diametrical line, the two points at which the force is applied move along the diametrical line according to the application of the force. In the case where one of the two points at which the force is applied is free and the other point is fastened, the fastened point is not subject to the force applied directly by a driving mechanism or an actuator but subject to reactive force from a fastening that holds the optical fiber. Thus, the circular loop is transformed into an oval loop through the applied force and the reactive force.

When winding the optical fiber into a circular loop, the minimum radius of the loop varies according to the variety of the optical fiber. For example, the minimum curvature radius for totally reflecting the light propagating in the core by the cladding is 38 mm for a quartz optical fiber with its core 9.6 μm in diameter, and 25 mm for a plastic optical fiber with its core 480 μm in diameter. Therefore, it is not preferable to wind the optical fiber into a circular loop having a curvature radius smaller than the minimum curvature radius described above. If the winding of the optical fiber is performed with the radius smaller than the minimum curvature radius for the total internal reflection, a leakage of the light toward the outside occurs before the transformation of the loop, thereby reducing the amount of light. This increases the optical loss of the attenuator itself and at the same time diminishes the range in which the amount of light is variable. Therefore, the radius of the circular loop formed by winding the optical fiber is desired to be substantially slightly larger than the minimum curvature radius such that the cladding reflects totally the light propagating in the core. In the case of a single loop, making the difference between the diameter of the circular loop and the minor axis of the oval loop smaller than or equal to 20 mm is desirable for diminishing the overall size of the attenuator. In the case of a multiple loop, even if the difference between the diameter of the circular loop and the minor axis of the oval loop is made small, the range in which the amount of light is variable can be secured. The enlargement of the diameter of the circular loop extends the insensitive range where the transformation of the loop does not change the amount of light, thereby making larger the size of the attenuator.

Alternatively, force may be applied at three or more positions spaced equally around the circular loop. In this case, however, the mechanism for applying force becomes undesirably complex. Therefore, it is preferable to apply force at two points positioned at each end of the diametrical line to transform the circular loop into the oval loop, because the control for changing the curvature radius and the mechanism for applying force can be simplified.

When a multiple circular loop formed by winding by plural turns the optical fiber is transformed into an multiple oval loop by applying force at two points positioned at each end of the diametrical line, the number of the areas in which the curvature radius is smallest can be increased. Since an oval loop obtained by transforming a circular loop has the minimum curvature radius at two points, the minimum curvature radius areas twice as many as the number of turns can be obtained. Therefore, when obtaining a given optical attenuation, the minimum curvature radius of a multiple loop can be made larger as compared to that of a single loop. Specifically, the transformation of the optical fiber can be reduced, and thus the stress formed in the optical fiber can be decreased accordingly. In addition, since the amount of transformation can be reduced, the stroke of the actuator becomes smaller. Therefore, the size of the actuator can be reduced. The optical attenuation of a multiple loop can be made larger compared to that of a single loop with respect to a given amount of transformation.

Since the variable optical attenuator of the present invention including a circular loop formed from the optical fiber transforms the circular loop into an oval loop to attenuate the input light, the attenuator is simple in structure. Several numbers of other optical elements are not required to be interposed between the input optical fiber and output optical fiber. In addition, the optical axis alignment between the input optical fiber and output optical fiber is not needed. Consequently, the optical loss does not occur in the state of the circular loop, and thus the optical loss caused by the optical attenuator itself does not exist.

In the variable optical attenuator of the present invention, the minimum curvature radius of the oval loop obtained by transforming the circular loop formed by winding the optical fiber is desired to be 10 to 35 mm.

The change of the curvature radius of the bent optical fiber in the range 10 to 35 mm corresponds to the change of the optical attenuation in the range 0.05 to 100 (−dB). When the minimum curvature radius is smaller than 8 mm, the optical fiber may break. Thus, the minimum curvature radius is desired to be larger than 10 mm. In the range 10 to 15 mm of the curvature radius, the rate of change of the optical attenuation is very large, and thus the minimum curvature radius is more preferably set to the range 15 to 35 mm. The minimum curvature radius is still more preferably set to the range 20 to 35 mm where the rate of change of the optical attenuation is small. Even when the range where the rate of change of the optical attenuation is small is employed, if the number of turns for winding the optical fiber into a circular loop is increased, the desired optical attenuation can be achieved, and precision control becomes also possible.

Preferably, the variable optical attenuator of the present invention includes a circular loop formed by winding by at least one turn the optical fiber and an actuator or a mechanism for applying force from the inside or outside of the circular loop to transform the circular loop into an oval loop.

Suppose that the two points positioned on the circular loop and corresponding to each end of the diametrical line of the circular loop are held by a holder. The circular loop can be transformed into an oval loop by moving the holder toward the outside of the circular loop along the diametrical line. Alternatively, the holder may be moved toward the center of the circular loop to transform the circular loop into an oval loop. When the holder is moved toward the outside of the circular loop, the optical fiber has the minimum curvature radius at the position of the holder. When the holder is moved toward the inside of the circular loop, the minimum curvature radius is formed at an area orthogonal to the holder (a position 90 degrees away from the holder) and the maximum curvature radius is formed at the position of the holder. It is preferable to move the holder toward the inside of the circular loop so that the maximum curvature radius is formed in a place where the loop is held by the holder, because the damage of the optical fiber caused by the holder can be reduced.

A holder configuration can be employed in which force is applied only in a loop transforming direction without holding the two points positioned on the circular loop and corresponding to each end of the diametrical line of the circular loop. Such a holder can have a configuration in which the pushing force is applied in a direction extending from the outside of the loop toward the center of the loop, or in a direction extending from the inside of the loop toward the outside of the loop. The optical fiber thus transformed into the oval loop will return to the original circular loop due to the elasticity of the optical fiber. The configuration of the holder can be simplified by employing this recoil strength.

Suppose that the two points positioned on the circular loop and corresponding to each end of the diametrical line of the circular loop are held by two holders. When moving the holders to transform the circular loop into the oval loop, the holders can be moved simultaneously. Alternatively, it is possible to move only one of the holders while holding the other holder or securing it by use of a fastening. Preferably, while securing, by use of a holder or a fastening, the intersecting point obtained by winding the linear optical fiber into the circular loop, that is, the intersecting point of the starting side and the end side of the circular loop, the opposite point with respect to the intersecting point is moved by use of the holder. Since the elastic force to return the circular loop of the optical fiber to the linear state works, the area of the intersecting point is required to be secured by use of resin or the like. If an area separate from the intersecting point and positioned on the loop is secured by use of resin or the like, the position of the intersecting point may move in accordance with the transformation of the circular loop into the oval loop. In order to maintain the relation between the displacement of the holder and the optical attenuation, it is essential to secure the intersecting point. When one of the holders is secured and fastened to the intersecting point of the loop by use of resin or the like, it becomes easy to maintain the relation between the displacement of the other holder and the optical attenuation. Preferably, the resin for fastening the intersecting point of the optical fiber is based on soft silicon or rubber. It is undesirable to use epoxy resin which can extremely harden or to tightly secure the intersecting point of the loop by use of a U-shaped bolt and nut. When the optical fiber is transformed into the oval loop with the intersecting point of the loop tightly fastened, the curvature radius may not change, or large force applied locally in the vicinity of the intersecting point may cause the damage of the optical fiber.

The holder for transforming the optical fiber is that part of the arm of the actuator which contacts the optical fiber or an element provided on the arm of the actuator. Preferably, that part of the holder which contacts the optical fiber is plane or has a curvature radius larger than the maximum curvature radius obtained by transforming the circular loop into the oval loop. If the holder has a curvature radius smaller than the maximum curvature radius, undesirable force will be applied locally to the optical fiber at the both ends of the holder when the loop is transformed to have its maximum curvature radius. The use of the plane part of the arm as the holder can reduce the number of elements. In order to prevent the optical fiber from moving in a direction orthogonal to the transforming direction when the actuator is operated, it is desirable to form a concave in the contact face of the holder, into which the optical fiber is fit.

When the actuator for moving the holder is arranged within the circular loop, the size of the variable optical attenuator can be reduced. Alternatively, the actuator may be arranged outside the circular loop. The mechanism for moving the holder may include a combination of a cam or a rack with a pinion and a stepper motor or a linear motor serving as a driving source. Since the recoil strength to restore the original linearity of the optical fiber works, the mechanism preferably includes the function of a latch to prevent the actuator from being restored by the recoil strength. The driving of the actuator may be manual or automatic. An electric driving is preferable for controlling the optical attenuation while monitoring the amount of light.

The variable optical attenuator according to the present invention may comprise: a circular loop formed by winding by at least one turn an optical fiber having an input end and an output end; an actuator which, at two points positioned on the circular loop and corresponding to each end of a diametrical line of the circular loop, applies force in an opposite direction with respect to the two points along the diametrical line to transform the circular loop into an oval loop so that an amount of output light of the optical fiber is reduced relative to an amount of input light of the optical fiber; an optical power monitor connected to the output end of the optical fiber and used for measuring the output amount of light from the optical fiber; and a controller for comparing the amount of output light measured by the power monitor to a predetermined amount of light to drive the actuator in accordance with a difference between the amount of output light measured by the power monitor and the predetermined amount of light.

The adjustment of the amount of light to the predetermined value can be performed by combining an optical power monitor (referred to below as the OPM) for measuring the amount of light with the variable optical attenuator having the circular loop formed from the optical fiber. A short description will be given below of the OPM. In the OPM, several percent of the input light is taken into a photodiode and the remaining light is output to the output optical fiber as the output light. The voltage corresponding to the amount of light taken into the photodiode is output from the photodiode to determine the amount of input light. The OPM output voltage obtained by measuring the amount of input light is input to the controller to determine the desired displacement of the holder. The displacement is sent to the actuator to drive the holder, so that the circular loop is transformed into the oval loop. When the circular loop is transformed, the amount of light is attenuated to lower the OPM input amount of light. Then, the output voltage of the OPM is input to the controller to decide whether the amount of output light is equal to the predetermined value. If the amount of output light is not in the range of the predetermined value, the actuator is again driven to adjust the amount of output light to the range of the predetermined value. That part of light which is taken into the OPM to be input to the photodiode becomes a loss. Therefore, the amount of light input to the photodiode of the OPM is preferably several percent or less. If the amount of light input to the photodiode is 10 percent, the optical loss caused by the OPM is 10 percent. Thus, without any optical attenuation by the loop, the amount of output light is attenuated 10 percent relative to the amount of input light. In other words, any control of 10 percent or less can not be achieved. Accordingly, the amount of light input to the photodiode of the OPM is preferably substantially several percent.

By forming the optical fiber connected to the input terminal of the OPM into the circular loop and assembling the circular loop thus formed, the actuator and the controller into an enclosure, a small-size variable optical attenuator can be realized. It is also possible to combine a variable optical attenuator including the circular loop, actuator and controller with an OPM separately provided. In this case, however, the connection between the variable optical attenuator and the OPM is needed. In addition, the output of the OPM is required to be linked to the controller, making the miniaturization difficult. It could be easily understood that the reduction of the number of connections for optical fiber and electrical circuit results in higher reliability.

Due to the fluctuation of the refractive index of the optical fiber and the thermal expansion/contraction of the driving mechanism (actuator) elements, each corresponding to the change of the surrounding temperature of the optical attenuator, the displacement of the holder, i.e. the variation of the curvature radius and the variation of the amount of light fluctuate slightly. In this case, by feeding back the output of the OPM to the driving mechanism, the amount of output light can be accurately controlled without being affected by the surrounding temperature. Furthermore, it is well known that the curvature radius and the optical attenuation vary according to the variety of the optical fiber in use and the optical wavelength. The measurement of the amount of light by use of the OPM can eliminate the effects of the variety of the optical fiber and the optical wavelength.

As described above, according to the present invention, the attenuation of the amount of light can be controlled by adjusting the curvature radius of the oval loop obtained by transforming the circular loop formed by winding the optical fiber. In the variable optical attenuator of the present invention, optical elements such as a Faraday rotor and a reflecting mirror are not required to be interposed between the input end and output end. Consequently, complex alignment of the optical axis is not needed, and any loss caused by the optical elements is not required to be considered. The combination with the OPM enables a more accurate and constant control of the amount of light. In addition, since the structure is simple, a small and low-cost variable optical attenuator can be provided.

Detailed descriptions of the variable optical attenuator of the present invention will be given below with reference to the accompanying drawings.

EXAMPLE 1

FIG. 1 shows the configuration of a variable optical attenuator according to EXAMPLE 1 of the present invention. Referring to the drawing, the variable optical attenuator 1 is shown with its cover (not shown) removed. Provided in a metal enclosure 11 are an optical fiber 10, an electric wire 9 used for a control signal and a power supply wire 12 for driving an actuator, each penetrating the side wall of the enclosure 11. The optical fiber 10 is wound inside the enclosure 11 to form a circular loop 2. In the present EXAMPLE, the number of turns of the optical fiber is one, and the diameter of the loop is set to 80 mm. A gap of at least approximately 1 mm is arranged so that the loop formed by winding the optical fiber does not contact the bottom and walls of the enclosure 11. While the intersecting point of the circular loop 2 is fastened by an intersecting point fastening 5, a loose fastening is employed so that the maximum curvature radius is formed at the intersecting point when the circular loop is transformed into a substantially oval loop 3 shown by a dashed line in the drawing. A loose fastening denotes a fastening state in which the curvature radius can be easily changed, and in this state the intersecting point fastening is not tightly secured to the optical fiber by use of a screw or adhesive agent. While the intersecting point fastening 5 is secured to the enclosure 11, the intersecting point fastening 5 is loosely secured to the optical fiber 10 by use of silicon rubber.

As a driving mechanism 7 for transforming the circular loop 2 into the oval loop 3, a linear actuator using a stepper motor is employed. A holder 6 is provided in that part of an arm 4 of the driving mechanism 7 which contacts the optical fiber. A concave into which the optical fiber is fit is formed in that part of holder 6 which contacts the optical fiber. The bottom of the concave is made plane. The movable distance of the linear actuator or the maximum stroke of the holder 6 is set to 20 mm. The contact point of the holder 6 of the linear actuator with the optical fiber is not made fixed, that is, a structure is employed in which the holder 6 pushes the optical fiber. Since force to return the oval loop obtained by transforming the optical fiber to the original circular loop works, the optical fiber is contacted only at the pushing point. Electricity for driving is supplied to the driving mechanism 7 through the power supply wire 12 and a power supply unit 8. A driving mechanism control signal corresponding to the displacement of the holder in accordance with the attenuated amount of light is supplied to the driving mechanism 7 through a control signal line 9.

Figure 2:
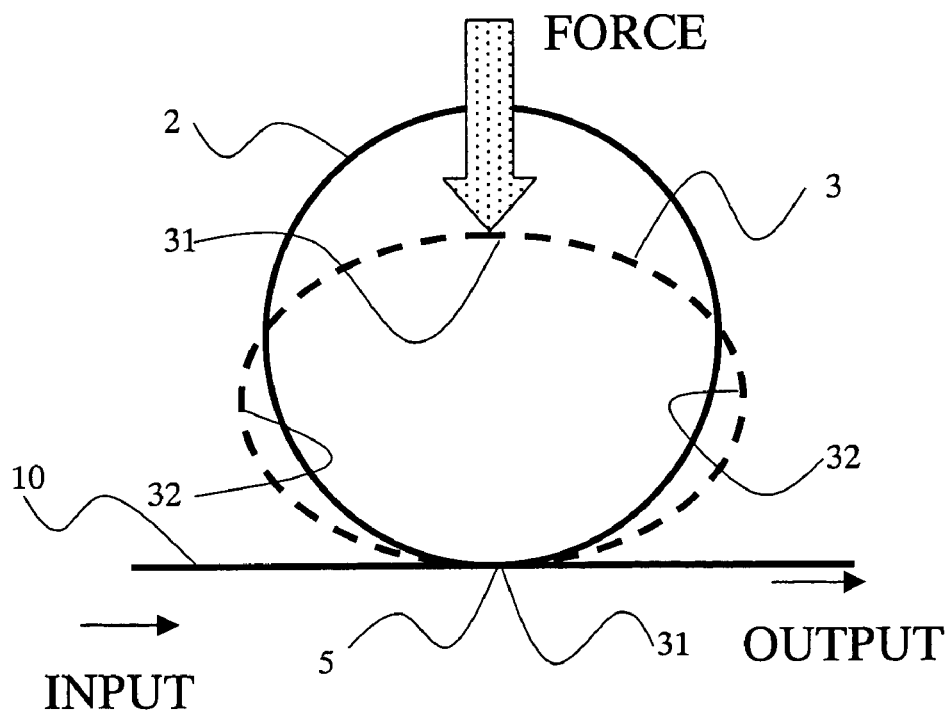
FIG. 2 is an explanatory diagram showing a loop transformation and a curvature radius.
Figure 3:
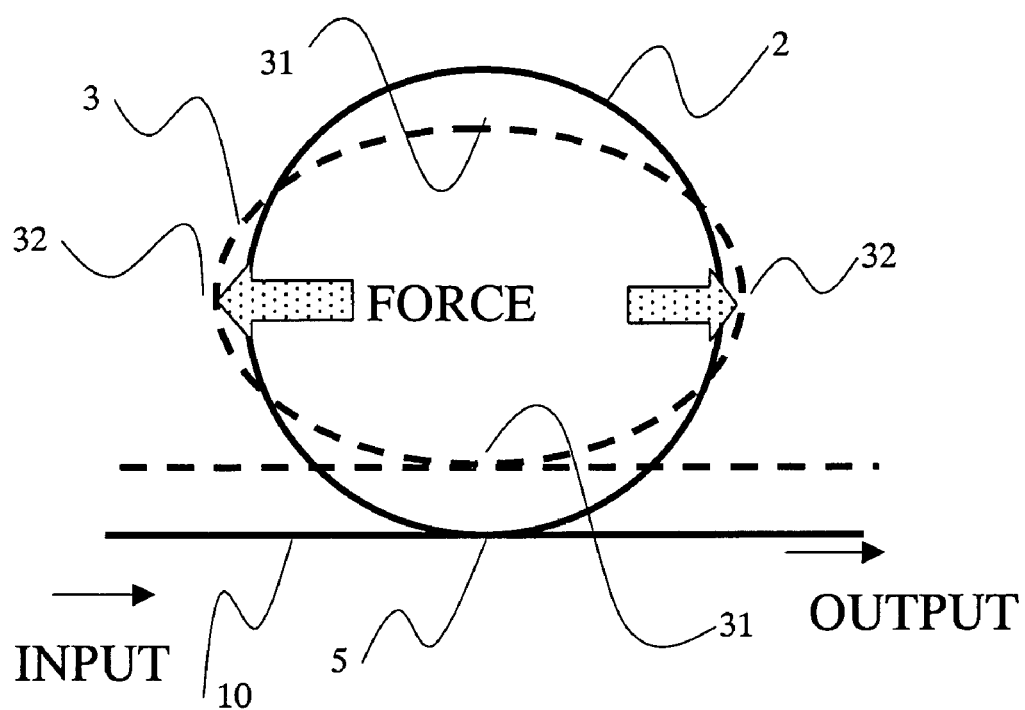
FIG. 3 is another explanatory diagram showing the loop transformation and the curvature radius.

FIGS. 2 and 3 show a state of the optical fiber before transformation (solid line) and a state of the optical fiber after transformation (dashed line). FIG. 2 illustrates a state in which with the intersecting point loosely fastened, the loop is deformed at the position on the loop which is opposite the intersecting point located on the central line. The drawing of the intersecting point fastening 5 is omitted. When the circular loop 2 is transformed in a direction of arrow, the intersecting point 5 and the point on the loop which is opposite the intersecting point 5 have the maximum curvature radius 31. The two areas positioned on a line orthogonal to the line including the two points described above have the minimum curvature radius 32. When this minimum curvature radius becomes smaller than the curvature radius for the cladding to totally reflect the light propagating in the core, the light leaks from the optical fiber, attenuating the output light relative to the input light. FIG. 3 shows a variation of the embodiment shown in FIG. 2, that is, a modification where the areas having the minimum curvature radius 32 are pushed by the holder in a direction extending from the inside of the loop to the outside of the loop. In this case, the areas contacting the holder have the minimum curvature radius 32.

Figure 4:
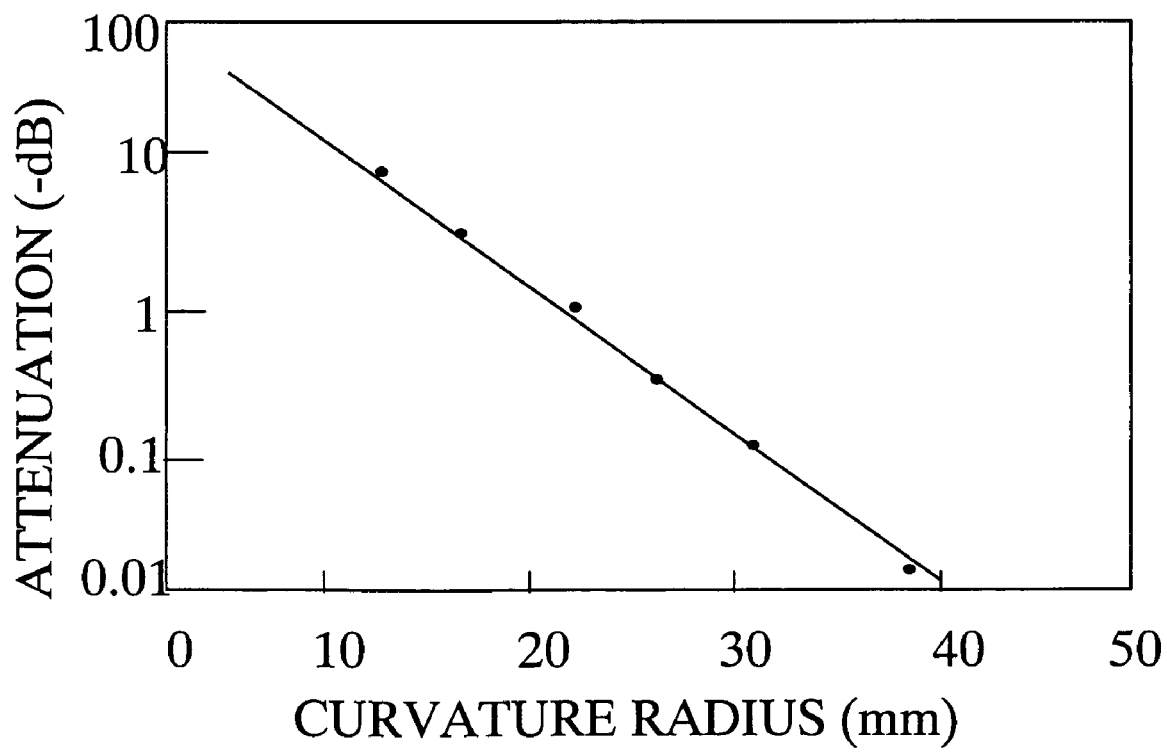
FIG. 4 is a graph showing the relation between an attenuation of light and a minimum curvature radius.
Figure 5:
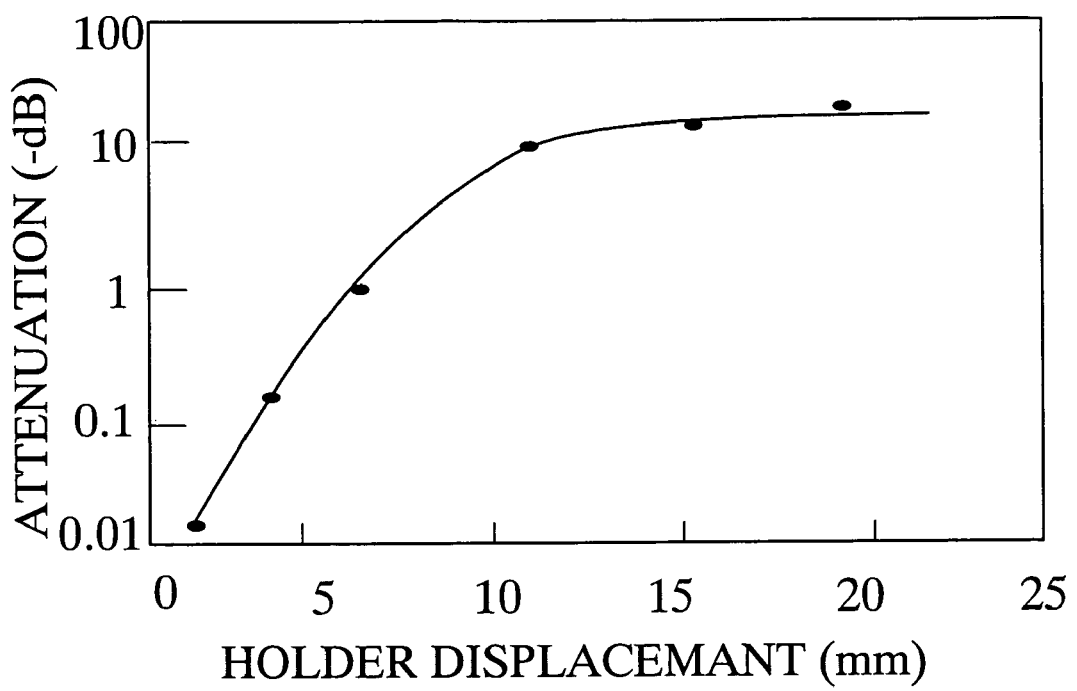
FIG. 5 is a graph showing the relation between an attenuation of light and a holder displacement.

FIG. 4 is a graph showing the relation between the optical attenuation and the minimum curvature radius in the case where the circular loop is transformed into the oval loop as shown in FIG. 2. The radius of the circular loop before transformation is set to 40 mm. FIG. 5 is a graph showing the relation between the optical attenuation and the displacement of the holder. A quartz optical fiber with its core 9.6 µm in diameter was used as the optical fiber. The optical wavelength of 1310 nm was used. Since the optical attenuation varies according to the variety of the optical fiber and the optical wavelength, the relation between the optical attenuation and the curvature radius is required to be determined in advance. As shown in FIG. 4, the relation between the optical attenuation and the minimum curvature radius is expressed as an exponential function. As shown in FIG. 5, the relation between the optical attenuation and the displacement of the holder is also expressed as an exponential function. Accordingly, using these data, a given displacement of the holder can be calculated from the desired attenuation. The displacement of the holder thus calculated is input to the driving mechanism as the control signal to adjust the optical attenuation to the targeted value. It is noted that the optical attenuation shown in the drawings is represented by 20 log (the amount of light after transformation)/(the amount of light before transformation) (−dB).

A description will be given below of the initial optical loss of the present embodiment. In the nonoperative state of the variable optical attenuator shown in FIG. 1, that is, in the state where the optical fiber is wound into the substantially circular loop so that the light propagating in the core is totally reflected by the cladding, the amount of the input light is substantially equal to the amount of output light. The optical fiber 10 shown in FIG. 1 has no joint between the input end and the output end. In addition, a Faraday rotor, a polarizer, an analyzer and a shielding member are not disposed between the input end and output end; the optical loss caused by these elements does not exist. Consequently, the optical loss caused by the variable optical attenuator itself according to the invention is very small.

EXAMPLE 2

Figure 6:
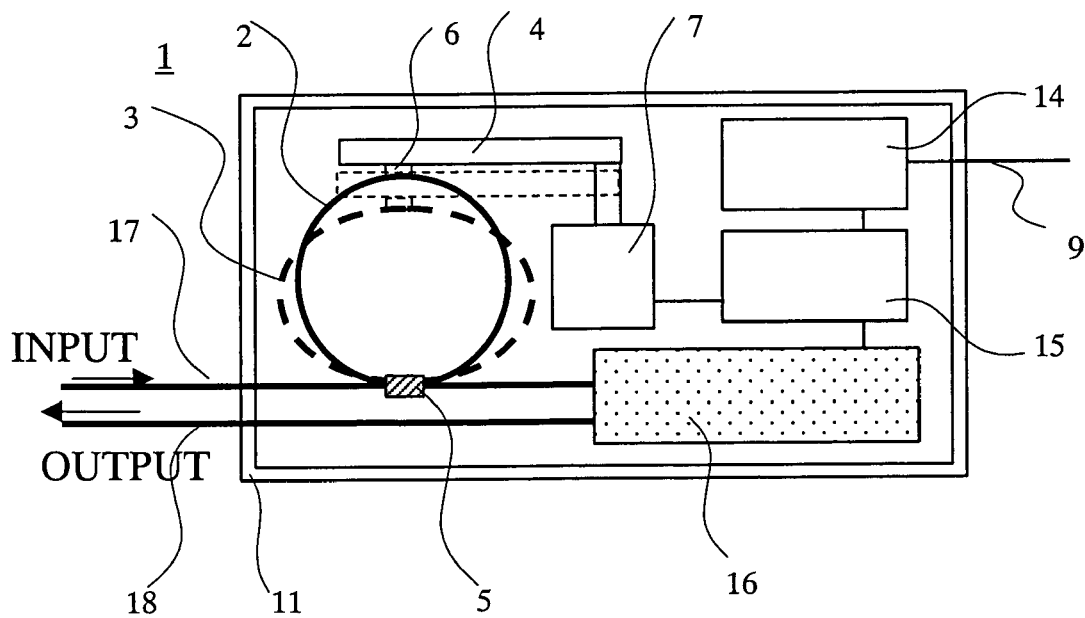
FIG. 6 is a plan view of a variable optical attenuator according to EXAMPLE 2 of the present invention.

FIG. 6 shows EXAMPLE 2 of a variable optical attenuator according to the present invention. In this embodiment, together with the variable optical attenuator used in the previous EXAMPLE, controller 15, an OPM 16 and a power supply 14 are assembled into an enclosure 11. The appearance of this embodiment is slightly different from that of the previous embodiment in that an input optical fiber 17 and an output optical fiber 18 extend in a single direction from the enclosure 11 and there is no control signal line; only a power supply wire 9 extends outside the enclosure 11. Since a controller 15 for calculating the displacement of the optical fiber based on the output from the OPM to control a driving mechanism 7 is disposed within the enclosure 11, the signal line can be omitted. In this case, the driving mechanism 7 is controlled so as to correspond with the amount of light which is predetermined in the controller 15. The predetermined value for the amount of light can be changed by means of a radio method such as infrared ray, radio wave, ultrasound, etc. by using the controller. Of course, the predetermined value changing signal can be sent via a wire to the controller. In this case, while the number of lines extending outside the enclosure 11 increases, the controller becomes simpler in structure.

A circular loop 2 is formed by winding the OPM input optical fiber 17 by two turns to have a diameter of 80 mm. Two percent of the input light is input to the photodiode (not shown) of the OPM. The controller 15 calculates the displacement of the driving mechanism based on the amount of light measured by the OPM to thereby operate the driving mechanism so that the optical fiber is transformed into an oval loop 3 by a holder 6. After having attenuated the input light, the OPM input amount of light is again measured to re-operate the driving mechanism to achieve the predetermined value. Since a loss of 2 percent is caused by the OPM, a difference of 2 percent arises between the amount of input light and that of the output light of the OPM. Therefore, in order to adjust the amount of the output light of the OPM to the predetermined value, the amount of input light of the OPM or the amount of output light of the optical fiber after being wound into a circular loop is increased by two percent. Since the number of turns of the optical fiber is set to two, the displacement of the optical fiber can be reduced to approximately 70 percent of that of EXAMPLE 1.

EXAMPLE 3

Figure 7:
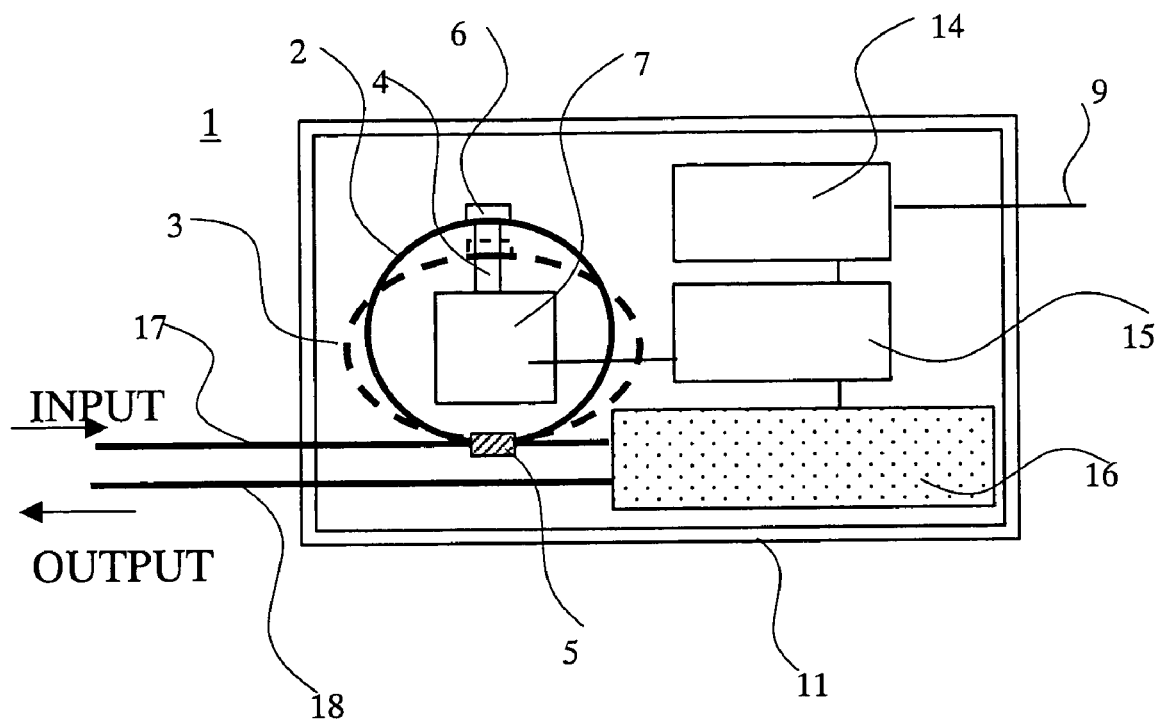
FIG. 7 is a plan view of a variable optical attenuator according to EXAMPLE 3 of the present invention.

FIG. 7 shows EXAMPLE 3 of the variable optical attenuator according to the present invention. While the configuration of this EXAMPLE is substantially equal to that of EXAMPLE 2, EXAMPLE 3 is different from EXAMPLE 2 in that a driving mechanism 7 is disposed within a circular loop 2 and the number of turns of the input optical fiber 17 is set to 4. A holder 6 provided on an arm 5 is disposed at a position crossing the optical fiber and located outside the optical fiber so that the circular loop 2 is pulled from the outside toward the center. Since the driving mechanism is arranged within the loop, the displacement of the holder is required to be as small as possible. Thus, the number of turns is increased. Because of this structure, further miniaturization can be achieved.

What is claimed is:

1. A variable optical attenuator comprising:
    a circular loop formed by winding by at least one turn an optical fiber having an input end and an output end; and
    an actuator which, at two points positioned on the circular loop and corresponding to each end of a diametrical line of the circular loop, applies force in an opposite direction with respect to the two points along the diametrical line to transform the circular loop into an oval loop so that an amount of output light of the optical fiber is attenuated relative to an amount of input light of the optical fiber,
    wherein a minimum curvature radius of an oval loop formed by transforming the circular loop is 10 to 35 mm.

2. The variable optical attenuator according to claim 1, further comprising:
    an optical power monitor connected to the output end of the optical fiber and used for measuring the output amount of light from the optical fiber; and
    a controller for comparing the amount of output light measured by the power monitor to a predetermined amount of light to drive the actuator in accordance with a difference between the amount of output light measured by the power monitor and the predetermined amount of light.

* * * * *